United States Patent Office 3,736,225
Patented May 29, 1973

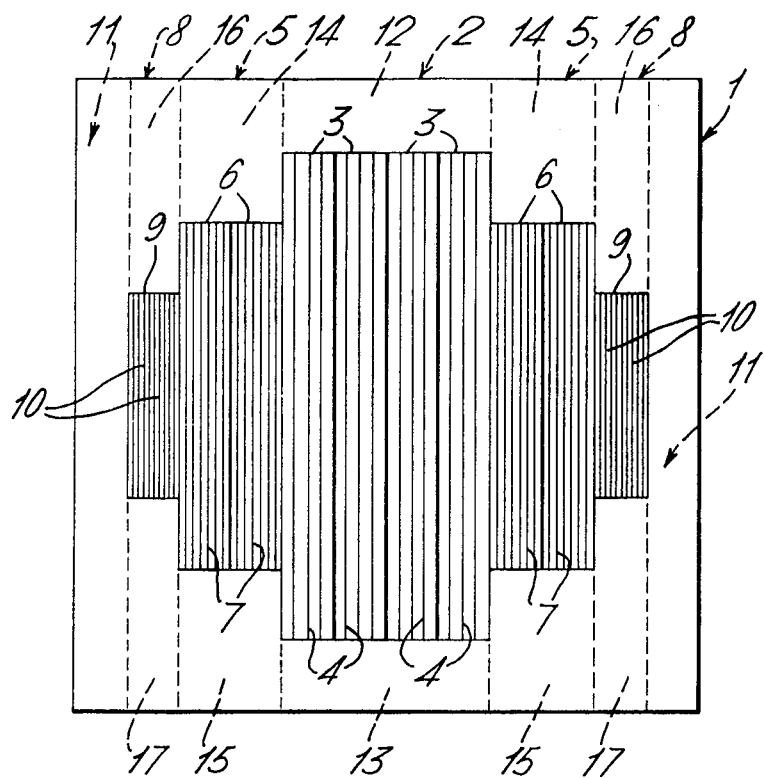

3,736,225
Allan Barker, Chester, and Maurice Arthur Perks, Warrington, England, assignors to United Kingdom Atomic Energy Authority, London, England
Filed July 27, 1970, Ser. No. 58,454
Claims priority, application Great Britain, Aug. 8, 1969, 39,924/69
Int. Cl. G21c 3/00
U.S. Cl. 176—40     4 Claims

ABSTRACT OF THE DISCLOSURE

A fast reactor core structure comprises inner, intermediate and outer core zones. The fuel members of the inner zone are longer and more widely spaced than the fuel members of the intermediate zone. Likewise the fuel members of the intermediate zone are longer and more widely spaced than the fuel members of the outer zone. Such an arrangement provides a more uniform power distribution across the core using a constant pin diameter and fissile content for the whole core.

BACKGROUND OF THE INVENTION

This invention relates to nuclear reactors, and in particular to that kind of nuclear reactor whose core is formed from an array of fuel elements arranged in a suitable configuration. A typical example is a fast nuclear reactor in which fuel sub-assemblies which are hexagonal in cross-section are arranged generally parallel and in contact with one another to form a generally cylindrical core region, which, to give breeding, can be surrounded by a blanket comprising other hexagonal-section assemblies, some containing breeder and others containing reflector. In such a core, there is a considerable variation of neutron flux from the central regions of the core, where flux is at a maximum, to the outer regions where flux is at a minimum. This gives rise to a large power variation across the core, with the result that the mean power output of the core can be relatively low. In order to "flatten" the power distribution across the core, there are available two expedients: firstly, to vary the concentration of fuel across the core so that there is a greater concentration of fuel in the outer regions, and secondly, to vary the fissile content of the fuel across the core so that there is a higher fissile content in the outer regions. Varying the concentration of fuel can be effected either by varying the diameter of fuel pins in the fuel sub-assemblies so that the fuel pins in the outer regions are of greater diameter than those in the central regions, or by employing a greater number of fuel pins per sub-assembly. The disadvantage of a greater number of fuel pins is that coolant volume is unacceptably reduced, and the disadvantages of variable fissile content and variable pin diameter are greater complexity and expense of manufacture and more difficulty in refuelling management.

It is an object of the present invention to provide a nuclear reactor core configuration in respect of which the said disadvantages are obviated or reduced and in respect of which other advantages accrue, as will be apparent from the ensuing description.

SUMMARY OF THE INVENTION

According to the invention, a nuclear reactor has a core formed from an array of fuel members and with at least inner and outer core zones, the fuel members constituting the inner zone being longer and more widely spaced than the fuel members constituting the outer zone, and both the fissile content of the fuel and the fuel member cross-section being constant across the whole core, whereby the variation of power output across the core is reduced.

Such configuration of core also enables a high mean coolant outlet temperature to be achieved without the need for coolant flow variation across the core.

DESCRIPTION OF THE DRAWING

A specific example, as applied to a fast breeder nuclear reactor cooled by liquid metal is illustrated diagrammatically in the sole figure of the accompanying drawing, which is a side view in medial section.

DESCRIPTION OF THE PREFERRED EMBODIMENT

The combined core and blanket 1 of the reactor is generally cylindrical and consists of a three zone core, the central zone 2 consisting of long length fuel sub-assemblies 3 each having fuel pins 4 with substantial spacing therebetween; the intermediate zone 5 consisting of intermediate length fuel sub-assemblies 6 each having fuel pins 7 with less spacing therebetween compared with the spacing of pins 4; and an outer zone 8 consisting of short fuel sub-assemblies 9 each having fuel pins 10 with the minimum spacing therebetween as is reconcilable with satisfactory cooling. The fuel pins 4, 7 and 9 are all of constant diameter, and the fissile content of the fuel in all the zones is the same.

The radial breeder region is indicated at 11, and axial breeder in the central zone 2 is provided above and below the fuel pins 4, namely in regions 12, 13 respectively; in the intermediate zone 5 above and below the fuel pins 7 in regions 14, 15 respectively; and in the outer zone 8 above and below fuel pins 10 in regions 16, 17 respectively.

The illustrated core configuration leads to an improved (flattened) radial power distribution, permits a high mean coolant outlet temperature without recourse to any different gagging as between zones, of the coolant channels provided by the fuel sub-assemblies, can provide a low fuel inventory, and is expected to reduce reactor doubling time. Furthermore, fuel manufacturing is assisted to the extent that the fuel pins for the whole core are of constant diameter and fissile content.

We claim:

1. A liquid cooled nuclear reactor having a core formed from an array of parallel fuel members of uniform fissile content and uniform area of cross-section which, in a plane transverse to the longitudinal axes of the fuel members, are arranged in at least inner and outer core zones, coolant flow being parallel to the longitudinal axes of the fuel members, the fuel members constituting the inner zone being longer and more widely spaced than the fuel members constituting the outer zone thereby to achieve a substantially uniform power output distribution across the core.

2. A nuclear reactor as claimed in claim 1 with inner, intermediate and outer core zones, the fuel members constituting the inner zone being longer and more widely spaced than the fuel members constituting the intermediate zone and likewise the fuel members constituting the intermediate zone being longer and more widely spaced than the fuel members constituting the outer zone, the core also including breeder members located in positions surrounding the outer zone and at axial positions at the ends of the inner, intermediate and outer core zones.

3. A liquid metal cooled nuclear reactor as claimed in claim 1.

4. A nuclear reactor as claimed in claim 2, of the fast breeder type cooled by liquid metal.

References Cited

UNITED STATES PATENTS

| 3,344,032 | 9/1967 | Vendryes et al. | 176—46 X |
| 3,297,539 | 1/1967 | Beckurts et al. | 176—18 X |

REUBEN EPSTEIN, Primary Examiner

U.S. Cl. X.R.

176—18